United States Patent
Roberts et al.

(10) Patent No.: US 7,648,645 B2
(45) Date of Patent: Jan. 19, 2010

(54) PRE-POLYMER FORMULATIONS FOR LIQUID CRYSTAL DISPLAYS

(75) Inventors: Ralph R. Roberts, Cottage Grove, MN (US); Amy J. Hite, Cottage Grove, MN (US); Jane K. Wardhana, Saint Paul, MN (US); Kevin M. Lewandowski, Inver Grove Heights, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 138 days.

(21) Appl. No.: 11/557,540

(22) Filed: Nov. 8, 2006

(65) Prior Publication Data

US 2008/0108727 A1 May 8, 2008

(51) Int. Cl.
*C09K 19/00* (2006.01)
*C09K 19/06* (2006.01)
*C09K 19/52* (2006.01)

(52) U.S. Cl. .................. 252/299.01; 428/1.1; 428/1.2; 428/1.21; 428/1.3; 428/1.32; 430/20; 430/270.1

(58) Field of Classification Search ............ 252/299.01, 252/299.6; 428/1.1, 1.2, 1.21, 1.3, 1.32; 430/20, 270.1
See application file for complete search history.

(56) References Cited

U.S. PATENT DOCUMENTS

| | | | |
|---|---|---|---|
| 4,293,435 A | 10/1981 | Portugall et al. | |
| 4,587,038 A | 5/1986 | Tamura | |
| 5,270,843 A | 12/1993 | Wang | |
| 5,332,522 A | 7/1994 | Chen et al. | |
| 5,348,684 A | 9/1994 | Hemmerling et al. | |
| 5,516,455 A | 5/1996 | Jacobine et al. | |
| 5,620,630 A * | 4/1997 | Onishi et al. | 264/1.36 |
| 5,744,057 A | 4/1998 | Meyer et al. | |
| 5,780,629 A | 7/1998 | Etzbach et al. | |
| 5,847,068 A | 12/1998 | Maxein et al. | |
| 5,886,242 A | 3/1999 | Etzbach et al. | |
| 5,906,770 A | 5/1999 | Amundson et al. | |
| 5,956,113 A | 9/1999 | Crawford | |
| 6,147,156 A * | 11/2000 | Yamaya et al. | 524/806 |
| 6,271,898 B1 | 8/2001 | Clikeman et al. | |
| 6,340,733 B2 | 1/2002 | Slark et al. | |
| 6,448,301 B1 | 9/2002 | Gaddam et al. | |
| 6,587,097 B1 | 7/2003 | Aufderheide et al. | |
| 2005/0067094 A1 | 3/2005 | Chen et al. | |
| 2006/0046046 A1 | 3/2006 | Wang et al. | |

FOREIGN PATENT DOCUMENTS

| | | |
|---|---|---|
| JP | 08-062561 | 3/1996 |
| JP | 2006-022258 | 1/2006 |
| WO | WO 2005/044949 | 5/2005 |

OTHER PUBLICATIONS

Henry et al., "Effects of Formulation Variables on Liquid-Crystal Droplet Size Distributions in Ultraviolet-Cured Polymer-Dispersed Liquid-Crystal Cells," *J. Polym. Sci. Part B: Polym. Chem.*, vol. 43, pp. 1842-1848 (2005).

Karasawa et al., "Effects of Material Systems on the Polarization Behavior of Holographic Polymer Dispersed Liquid Crystal Gratings," *Jpn. J. Appl. Phys.*, vol. 36, pp. 6388-6392 (Oct. 1997).

Kato, et al., "Anchoring Effects of Self-Assembled Monolayers for Polymer-Dispersed Liquid Crystal Films," *J. Phys. Chem. B*, vol. 108, pp. 320-326 (2004).

Matsukawa et al., "Development of Photocuring Acrylic/silica Organic-Inorganic Hybrid for Negative Resists," J. Photopolym. Sci. Technol., vol. 14, No. 2, pp. 181-184 (2001).

Yang et al., "Bistable Cholesteric Reflective Displays: Materials and Drive Schemes," *Annu. Rev. Mater. Sci.*, vol. 27, pp. 117-146 (1997).

He, M. et al., Transmission Holographic Grating Using Siloxane-containing Liquid Crystalline Compounds. Importance of Chemical Structure of Polymer Matrix Components, Jun. 9, 2006, Polymer Journal vol. 38, No. 7 pp. 678-685.

* cited by examiner

*Primary Examiner*—Geraldina Visconti
(74) *Attorney, Agent, or Firm*—Lance L. Vietzke (57) ABSTRACT

A pre-polymer/liquid crystal composition is disclosed and includes, a liquid crystal component, a photo polymerization initiator, and a polymer precursor component. The polymer precursor component includes at least, a silane monomer, reactive (meth)acryloxy monomer or oligomer, and an ester, urethane, or (meth)acrylate based polymer or oligomer, bearing one or more reactive (meth)acrylate groups. Methods of forming a bistable electro-optical device are also disclosed.

23 Claims, 2 Drawing Sheets

PRE-POLYMER FORMULATIONS FOR LIQUID CRYSTAL DISPLAYS

BACKGROUND

The present disclosure relates generally to pre-polymer formulations for liquid crystal displays and methods of making bistable electro-optical devices using these pre-polymer formulations.

Polymer dispersed liquid crystal (PDLC) and polymer stabilized liquid crystal (PSLC) technologies have received much attention because of their potential utility for display applications. Adequate control of the phase separation between the liquid crystal and the polymer is important to many commercial applications.

The polymerization of a liquid crystal/monomer at a temperature at which the liquid crystal and monomer are soluble but the liquid crystal/polymer is insoluble is described as polymerization induced phase separation (PIPS). The size of the formed liquid crystal phase is apparently controlled by polymerization kinetics.

Devices of PDLC films sandwiched between transparent electrodes can be switched from a weakly scattering focal conic state to a reflective planar state upon applying an electric field (E) to the electrodes. Both of these states are stable at E=0. This means that the textures are "locked in" and will remain intact until acted upon again (i.e., the device is bistable). Switching from planar to focal conic states requires a low voltage pulse while the return from focal conic to planar requires a higher voltage pulse to drive the device into a homeotropic state which then relaxes to the final planar state.

SUMMARY

The present disclosure relates to pre-polymer formulations for cholesteric liquid crystal displays and method of making bistable electro-optical devices using these pre-polymer formulations.

In one exemplary implementation, a pre-polymer/liquid crystal composition includes, a liquid crystal component, a photo polymerization initiator, and a polymer precursor component. The polymer precursor component includes at least, a silane monomer, reactive (meth)acryloxy monomer or oligomer, and an ester, urethane, or (meth)acrylate based polymer or oligomer, bearing one or more reactive (meth)acrylate groups.

In another exemplary implementation, a method of forming a bistable electro-optical device includes providing a first substrate having a first conductive inner surface, providing a second substrate having a second conductive inner surface, disposing a pre-polymer/liquid crystal composition on the first conductive inner surface, disposing the second conductive surface on the composition, and curing the composition to formed a cured composition. At least one of the first substrate or second substrate is transparent to visible light. The pre-polymer/liquid crystal composition includes, a liquid crystal component, a photo polymerization initiator, and a polymer precursor component. The polymer precursor component includes at least, a silane monomer, reactive (meth) acryloxy monomer or oligomer, and an ester, urethane, or (meth)acrylate based polymer or oligomer, bearing one or more reactive (meth)acrylate groups.

These and other aspects of the formulations, methods and articles according to the subject invention will become readily apparent to those of ordinary skill in the art from the following detailed description together with the drawings.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternate forms, specifics thereof have been shown by way of example in the drawings and will be described in detail. It should be understood, however, that in intention is not to limit the invention to the particular embodiments described. On the contrary, the intention is to cover all modifications, equivalents, and alternatives falling within the spirit and scope of the invention.

DETAILED DESCRIPTION

Accordingly, the present disclosure is directed to pre-polymer/liquid crystal formulations for polymer induced phase separation (PIPS) and method of making bistable electro-optical devices using these pre-polymer/liquid crystal formulations.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend.

The term "pre-polymer" refers to a monomer or system of monomers that have been reacted to an intermediate molecular weight state. This material is capable of further polymerization by reactive groups to a fully cured high molecular weight state. As such, mixtures of reactive polymers with unreacted monomers may also be referred to as pre-polymers. The term "pre-polymer" and "polymer precursor" may be interchanged.

The phrase "equivalent weight of a functional group" means the ratio of the molecular weight to the number of occurrences of that functional group in the molecule. It is the weight of substance that contains one formula-weight of the functional group.

The phrase "equivalents of a functional group" provided by the mass $m_i$ of a monomer, oligomer or reactive polymer is that mass divided by the equivalent weight of the functional group.

The term "equivalent fraction" denoted $d_i$ is used to quantify the contribution to the cross linking density D of polymer P provided by monomer or oligomer i. It is given by $$d_i = \frac{\text{Equivalents of functional groups provided by mass } m_i}{\text{Total moles of all monomers in polymer } P}$$

Then the quantity D is given by $$D = \sum_i d_i$$

The term "alkyl" refers to a straight or branched chain monovalent hydrocarbon radical optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition. Substituents include alkoxy, hydroxy, mercapto, amino, alkyl substituted amino, or halo, for example. Examples of "alkyl" as used herein include, but are not limited to, methyl, ethyl, n-propyl, n-butyl, n-pentyl, isobutyl, and isopropyl, and the like.

The term "alkylene" refers to a straight or branched chain divalent hydrocarbon radical optionally containing one or more heteroatomic substitutions independently selected from S, O, Si, or N. Alkylene groups generally include those with one to twenty atoms. Alkylene groups may be unsubstituted or substituted with those substituents that do not interfere with the specified function of the composition. Substituents include alkoxy, hydroxy, mercapto, amino, alkyl substituted amino, or halo, for example. Examples of "alkylene" as used herein include, but are not limited to, methylene, ethylene, propane-1,3-diyl, propane-1,2-diyl and the like.

The term "aryl" refers to monovalent unsaturated aromatic carbocyclic radicals having a single ring, such as phenyl, or multiple condensed rings, such as naphthyl or anthryl. Aryl groups may be unsubstituted or substituted with those substituents that do not interfere with the specified function of the composition. Substituents include alkoxy, hydroxy, mercapto, amino, alkyl substituted amino, or halo, for example. Examples of "aryl" as used herein include, but are not limited to, phenyl, 2-naphthyl, 1-naphthyl, biphenyl, 2-hydroxyphenyl, 2-aminophenyl, 2-methoxyphenyl and the like.

The term "arylalkyl" refers to a monovalent unsaturated aromatic carbocyclic radicals having a single ring, such as phenyl, or multiple condensed rings, such as naphthyl or anthryl and further includes one or more alkyl functional group(s), as defined above. Arylalkyl groups may be unsubstituted or substituted with those substituents that do not interfere with the specified function of the composition. Substituents include alkoxy, hydroxy, mercapto, amino, alkyl substituted amino, or halo, for example.

The term "halogen" or "halo" shall include iodine, bromine, chlorine and fluorine.

The terms "mercapto" and "sulfhydryl" refer to the substituent —SH.

The term "hydroxyl" refers to the substituent —OH.

The term "amino" refers to the substituent —NH$_2$.

The term "(meth)acrylate" or "(meth)acrylic" is a general expression which includes both methacryloxy and acryloxy radicals.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The phrase "liquid crystal" refers to liquid crystal capable of exhibiting a nematic, smectic, or cholesteric phase.

The term a "chiral" unit refers to an asymmetrical unit containing a chiral unit, (e.g., unit that does not posses a mirror plane). A chiral unit is capable of rotating a plane of polarized light to either the left or the right in a circular direction.

The term a "mesogenic" unit refers to a unit having a geometrical structure that facilitates the formation of a liquid crystal mesophase.

The term a "nematic" liquid crystal compound refers to a liquid crystal compound that forms a nematic liquid crystal phase.

Cholesteric liquid crystal compounds generally include molecular units that are chiral in nature (e.g., molecules that do not possess a mirror plane) and molecular units that are mesogenic in nature (e.g., molecules that exhibit liquid crystal phases) and can be polymers. Cholesteric liquid crystal compositions may also include achiral liquid crystal compounds (nematic) mixed with or containing a chiral unit. Cholesteric liquid crystal compositions or materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal compositions are also referred to as chiral nematic liquid crystal compositions. The pitch of the cholesteric liquid crystal composition or material is the distance (in a direction perpendicular to the director and along the axis of the cholesteric helix) that it takes for the director to rotate through 360 degrees. This distance is generally 100 nm or more.

The pitch of a cholesteric liquid crystal material can be induced by mixing or otherwise combining (e.g., by copolymerization) a chiral compound with a nematic liquid crystal compound. The cholesteric phase can also be induced by a chiral non-liquid crystal material. The pitch may depend on the relative ratios by weight of the chiral compound and the nematic liquid crystal compound or material. The helical twist of the director results in a spatially periodic variation in the dielectric tensor of the material, which in turn gives rise to the wavelength selective reflection of light. For example, the pitch can be selected such that the Bragg reflection is peaked in the visible, ultraviolet, or infrared wavelength regimes of light.

Cholesteric liquid crystal compounds, including cholesteric liquid crystal polymers, are generally known and typically any of these materials can be used to make optical bodies. Examples of suitable cholesteric liquid crystal polymers are described in U.S. Pat. Nos. 4,293,435, 5,332,522, 5,886,242, 5,847,068, 5,780,629, and 5,744,057, all of which are incorporated herein by reference. Other cholesteric liquid crystal compounds can also be used. A cholesteric liquid crystal compound may be selected for a particular application or optical body based on one or more factors including, for example, refractive indices, surface energy, pitch, processability, clarity, color, low absorption in the wavelength of interest, compatibility with other components (e.g., a nematic liquid crystal compound, etc.), molecular weight, ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

The disclosure generally relates to pre-polymer/liquid crystal formulations for liquid crystal displays and method of making bistable electro-optical devices using these monomer/pre-polymer formulations.

Figure 1:
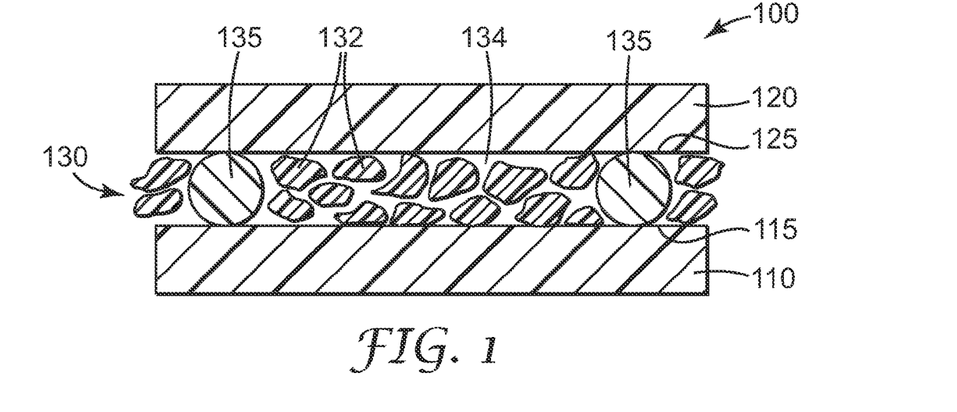
FIG. 1 is a schematic cross-sectional view of an illustrative liquid crystal display article.

FIG. 1 is a schematic cross-sectional view of an illustrative liquid crystal display article 100. In some embodiments, the liquid crystal display article 100 is a bistable electro-optical device. The liquid crystal display article 100 includes a first substrate 110 with a first conductive inner surface 115 and a second substrate 120 with a second conductive inner surface 125. A polymer dispersed liquid crystal composition 130 is disposed between the first substrate 110 and the second substrate 120. The polymer dispersed liquid crystal composition 130 is in contact with the first conductive inner surface 115 and the second conductive inner surface 125. In some embodiments, one or more spacers 135 are disposed between the first substrate 110 and the second substrate 120. Spacers 135 can set the distance between the first substrate 110 and the second substrate 120.

The first substrate 110 and the second substrate 120 can be formed of any useful material such as, for example, glass or polymer. In many embodiments, one or both substrates 110 and 120 can be transparent to visible light. In many embodiments, the first substrate 110 and the second substrate 120 are formed from a suitable polymeric material that has sufficient mechanical properties (e.g., strength and flexibility) to be processed in a roll-to-roll apparatus. By roll-to-roll, what is meant is a process where material is wound onto or unwound from a support, as well as further processed in some way. Examples of further processes include coating, slitting, blanking, and exposing to radiation, or the like. Examples of such polymers include thermoplastic polymers. Examples of useful thermoplastic polymers include polyolefins, polyacrylates, polyamides, polyimides, polycarbonates, polyesters, and biphenol- or naphthalene-based liquid crystal polymers. Further examples of useful thermoplastics include polyethylene, polypropylene, polystyrene, poly(methylmethacrylate), polycarbonate of bisphenol A, poly(vinyl chloride), polyethylene terephthalate, polyethylene naphthalate, and poly(vinylidene fluoride). Some of these polymers also have optical properties (e.g., transparency) that make them especially well-suited for certain display applications wherein they would support a patterned conductor, such as polycarbonates, polyimides, and/or polyesters.

The first substrate 110 and the second substrate 120 are flexible. The first substrate 110 and the second substrate 120 can have any useful thickness. These substrates 110 and 120 can be manufactured in a variety of thickness, ranging in general from about 5 micrometers to 1000 micrometers or from 25 micrometers to 500 micrometers, or from 50 micrometers to 250 micrometers, or from 75 micrometers to 200 micrometers.

The first substrate 110 conductive inner surface 115 and a second substrate 120 conductive inner surface 125 can be formed in any useful manner such as, for example, sputtering, chemical vapor deposition and the like. In many embodiments, a patterned conductor forms one or both of the conductive inner surfaces 115 and 125. The patterned conductor can be formed on one or both substrates by known techniques. The patterned conductor can be a relatively conductive, transparent coating. In many embodiments, the patterned conductor is transparent to visible light. The patterned conductor can include indium tin oxide or ITO, which can be transparent to visible light, depending on the thickness of the ITO conductor. In many embodiments, the patterned conductor has a generally uniform sheet resistivity. The patterned conductor can have any useful thickness such as, for example, a thickness of 10-100 nm. The pattern of the conductor may depend in part on the type of display and design parameters, such as size of end user display, etc. The patterned conductor can include a tin antimony oxide, a zinc oxide, or other appropriate conductive material.

A polymer dispersed liquid crystal composition 130 is disposed between the first substrate 110 and the second substrate 120. The polymer dispersed liquid crystal composition 130 includes a liquid crystal phase 132 dispersed (disperse phase) within a polymeric matrix 134 (continuous phase). In many embodiments, the polymer dispersed liquid crystal composition 130 is formed by polymerization induced phase separation (PIPS), where the size of the formed liquid crystal phase droplets is at least partially controlled by polymerization kinetics.

In many embodiments, this construction forms a bistable reflective cholesteric liquid crystal display. Application of an electric field (E) across the conductive inner surfaces 125 and 115 causes the liquid crystal 132 to be aligned in either the reflective planar state or the scattering focal conic state. Both of these states are stable at E=0, thus the textures are locked in and will remain intact until acted upon again (i.e., the device is bistable). Switching from the planar to focal conic requires a low voltage pulse while the return from focal conic to planar requires a higher voltage pulse to drive the device into a homeotropic state which then relaxes to the final planar state. An illustrative drive scheme for switching single pixel cholesteric liquid crystal display (i.e., ChLCD) cells is described by Deng-Ke Ynag et. al., (Annu. Rev. Mater. Sci. 1977, 27, 117-146). According to reflectance versus voltage plots described therein ChLCD cells can be switched to a voltage value $V_5$ at which the cell is in the planar state or $V_2$ at which point the cell is in the focal conic state. The associated pulse trains (frequency and amplitude) can be practiced by anyone skilled in the art.

Exemplary compositions described in the pending disclosure herein give corresponding stable planar state reflection. By stable state reflection it is meant that after being driven to the planar state by a voltage $V_5$ the cell experiences no loss of reflection after standing at ambient conditions for about three days.

The polymer dispersed liquid crystal composition 130 is disposed between the first substrate 110 and the second substrate 120 can have any useful thickness such as, for example, a thickness in a range from 1 to 15 micrometers. This polymer dispersed liquid crystal composition 130 having a thickness in a range from 1 to 15 micrometers can be formed via radiation curing in a range from 0.1 to 10 mW/cm$^2$ or in a range from 0.2 to 3 mW/cm$^2$.

The polymer dispersed liquid crystal composition 130 is formed by a process in which a reactive pre-polymer/liquid crystal composition is mixed and polymerized. In many embodiments, the reactive pre-polymer/liquid crystal composition forms a single phase where the liquid crystal does not polymerize. As the composition polymerizes, the polymer separates from the liquid crystal forming liquid crystal domains (e.g., droplets) dispersed within a polymer matrix. This phase separation process is termed polymerization induced phase separation (i.e., PIPS). In the PIPS process, the polymer phase separates from the liquid crystal during polymerization as the polymer chain length increases.

The reactive pre-polymer/liquid crystal composition includes a liquid crystal component, a photo polymerization initiator and a polymer precursor component. The components are chosen so that pre-polymer/liquid crystal composition forms a single phase until it is polymerized.

The liquid crystal component can be any useful liquid crystal such as, for example, a cholesteric liquid crystal material or a nematic liquid crystal material. The liquid crystal can be present in the composition in any useful amount. In many embodiments, the liquid crystal can be present in the composition a range from 60 to 95% wt, or from 70 to 95% wt.

The photo polymerization initiator can be any useful photo polymerization initiator. In many embodiments, the photo initiator includes hydroxy-alkylbenzophenones (e.g., Darocur™ available from Merck), benzoin ethers, alkylphenones, benzophenones, xanthones, thioxanthones, phosphine oxides (e.g., Irgacure™ 819 available from Ciba Specialty Chemicals), and their derivatives. Additional useful photo polymerization initiators are described in U.S. Pat. No. 5,516, 455 and is incorporated by reference to the extent it does not conflict with the present disclosure. The photo polymerization initiator can be present in the composition in any useful amount. In many embodiments, the photo polymerization initiator can be present in a range from 0.01 to 10% wt, or from 0.1 to 5% wt, or from 1 to 2% wt.

The polymer precursor component is a mixture of at least three different monomers and/or oligomers. The first component is a silane monomer that can be hydrolysable or non-hydrolysable. Illustrative silane monomers substitutes include alkoxysilanes, and acryloxysilanes. This first monomer can have the following structure (I):

(I)

where, $R^1$ is a acryloxy, methacryloxy, or (meth)acryloxyalkyl; $R^2$ is independently selected from hydrogen, $(C_1-C_{12})$ alkyl, $(C_6-C_{12})$aryl, or $(C_7-C_{17})$arylalkyl; X is hydrolysable or non-hydrolysable group; m is an integer from 1 to 3 and (m+p) is an integer from 1 to 3. Particularly useful silane monomers of structure (I) include the following:

(Ia)

(Ib)

(Ic)

(Id)

(Ie)

mixtures thereof where $R^7$ is hydrogen or —CH$_3$. Illustrative silane monomers include, for example, methacryloxypropyl trimethoxysilane (i.e., MPTMS), methacryloxypropyl dimethylethoxysilane (i.e., MPDMES), methacryloxypropyl trimethylsilane (i.e., MPTMeS), methacaryloxymethy phenyldimethylsilane (MMPDMS)

The second monomer can be any reactive (meth)acryloxy monomer or oligomer of structure (II):

(II)

where, $R^3$ is independently selected from acryloxy or methacryloxy, $R^4$ is $(C_1-C_{20})$alkyl or $(C_7-C_{17})$arylalkyl, optionally containing one or more heteroatomic substitutions independently selected from S, O, Si, or N; and n is an integer from 1 to 4. Useful reactive (meth)acrylate monomers or oligomers include, for example, glycerol derivatives, trimethlyopropane derivatives, and pentaerythritol derivatives. Particularly useful reactive (meth)acrylate monomer or oligomer of structure (II) include monomer or oligomers independently selected from one or more of the monomers or oligomers of structure (IIa-IId);

(IIa)

(IIb)

(IIc)

(IId)

where, Y is $(C_2-C_{20})$alkyl; n is individually an integer from 0 to 10; Z is —C$_2$H$_4$— or —C$_3$H$_6$—; $R^8$ is —H or —CH$_3$; and $R^9$ is —H or —OH. Illustrative monomers or oligomers of structure (II) include, for example, trimethylopropane triacrylate (i.e., TMPTA), hexanediol dimethacrylate (i.e., HDDMA), hexanediol diacrylate (i.e., HDDA), butanediol dimethacrylate (i.e., BDDMA), ethylene glycol dimethacrylate (i.e., EGDMA), ethylene glycol diacrylate (i.e., EGDA).

The third component in the polymer precursor is an ester, urethane, or (meth)acrylate based polymer or oligomer, bearing one or more reactive (meth)acrylate groups. In many embodiments, this third component is polyalkyl (meth)acrylate having pendant (meth)acrylate groups. An exemplary example is a polybutyl methacrylate with pendant or terminal methacryalte groups (PBMA-1). This type of material is described in U.S. Pat. No. 6,448,301 which is incorporated by reference herein to the extent it does not conflict. Another poly methacrylate having pendant methacrylate groups is described in U.S. Pat. No. 6,340,733 which is incorporated by reference herein to the extent it does not conflict. A commercially available (meth)acrylate based polymer or oligomer, bearing one or more reactive (meth)acrylate is the Elvacite family of polymers available from Lucite International. These are typically derived from methyl methacrylate, ethyl methacrylate and n-butyl methacrylate monomers. An exemplary example is Elvacite™ 4095 which comprises a copolymer of methyl methacrylate and butyl methacrylate.

In some embodiments, the polymer precursor optionally includes a third monomer of structure (III)

(III)

where, $R^5$ is hydrogen or —$CH_3$; $R^6$ is ($C_1$-$C_{12}$)alkyl, ($C_6$-$C_{12}$)aryl, or ($C_7$-$C_{17}$)arylalkyl.

One illustrative composition includes 60 to 95 wt % liquid crystal component, 0.1 to 5 wt % photo polymerization initiator with respect to the polymer precursor component, and 5 to 40 wt % polymer precursor component. The polymer precursor component includes 60 to 85 wt % of the first monomer of structure (I), 5 to 30 wt % of one or more second monomers of structure (II), 5 to 30 wt % of a ester, urethane, or (meth) acrylate based polymer or oligomer, bearing one or more reactive (meth)acrylate.

Another illustrative composition includes 70 to 95 wt % liquid crystal component, 0.1 to 5 wt % photo polymerization initiator with respect to the polymer precursor component, and 5 to 30 wt % polymer precursor. The polymer precursor component includes; 40 to 95 wt % of the first monomer of structure (I)

(Ia)

where, $R^7$ is hydrogen or —$CH_3$; 0.05 to 65 wt % of hexanediol dimethacrylate, and 5 to 55% wt of a polybutyl methacrylate having pendant methacrylate groups.

A further illustrative composition includes 70 to 95 wt % liquid crystal component, 0.1 to 5 wt % photo polymerization initiator, and 5 to 30 wt % polymer precursor. The polymer precursor component includes; 60 to 85 wt % of the first monomer of structure (I)

(Ia)

where, $R^7$ is hydrogen or —$CH_3$; 5 to 30 wt % of hexanediol dimethacrylate, and 5 to 30% wt of a polybutyl methacrylate having pendant methacrylate groups.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES 3-(Methacryloxy)propyltrimethoxysilane (MPTMS) was obtained from Alfa Aesar, Methacaryloxymethy phenyldimethylsilane (MMPDMS) was obtained from Gelest Inc., Morrisville, Pa.

Hexanediol dimethacrylate (HDDMA) was obtained from Sartomer Company, Inc., Exton, Pa.

Propoxylated (6) trimethylolpropane triacrylate was obtained from Sartomer Company with product code CD-501.

Propoxylated (3) trimethylolpropane triacrylate was obtained from Sartomer company with product code SR-492.

Elvacite™ 4059, a solid acrylic resin, was obtained from Lucite International Inc. It has a glass transition temperature of 40° C. and molecular weight (Mw) of 20,500. The supplier has quoted a (meth)acrylate functional group equivalent weight of about $1.37 \times 10^4$.

Irgacure™ 819 is the Ciba-Geigy Corporation trade name for phenylbis(2,4,6-trimethylbenzoyl)phosphine oxide and was obtained from Aldrich Chemicals.

The cholesteric liquid crystal described herein is a combination of the experimental materials MDA-01-1955 and MDA-00-3506 obtained form EMD Chemicals Inc., an affiliate of Merck KGaA, Darmstadt, Germany. The formulation was tuned to reflect at 546 nm for a thin coat sandwiched between glass slides. The LC formulation will be referred to as MDA-546

ITO-coated PET substrates can be obtained from Sheldahl (Northfield, Minn. 55057).

Contrast ratios are quoted as the ratio of the maximum planar state reflectance to the corresponding focal conic reflectance. Samples were placed on a black surface for these measurements. Higher contrast ratio values can be obtained when the back surface of the cell is painted, eliminating the substrate-air interface.

Example 1

Preparation of Poly Butyl Methacrylate with Pendant Methacrylate Groups

PBMA-1

A mixture of butyl methacrylate (29.25 g, 205.7 mmo, 35.7 equiv.), 2-hydroxyethyl methacrylate (0.75 g, 5.76 mmol, 1.0 equiv.), thiol glycolic acid isooctyl ester (0.30 g, 1.47 mmol), 2,2'-azobisisobutyronitrile (0.06 g), and ethyl acetate (100 g) were placed in a bottle and purged with nitrogen gas for 15 min. The bottle was capped and tumbled in a 60° C. water bath for 24 hr. To the cooled mixture, 2-isocyanatoethyl methacrylate (0.90 g) was added and the mixture was heated to 50° C. for 4.5 hours. The solution was then precipitated into methanol to give a white solid that was dried under vacuum. (Yield 16.2 g). The GPC determined molecular weight was Mw $3.20 \times 10^4$, Mn $1.65 \times 10^4$; Polydispersity 1.94. This polymer precursor is referred to in subsequent experiments as PBMA-1. From Mw the calculated value of pendant methacrylate repeat units is 5.7 giving a methacrylate equivalent weight of $5.6 \times 10^3$.

Example 2

Into a vial fitted with Teflon seal was introduced MPTMS (1.60 g, 80% by mass), PBMA-1 (0.17 g, 8.57%) and HDDMA (0.23 g, 11.43%). This was agitated on a mechanical shaker at room temperature for about 16 hours to give a clear solution. The photo initiator Irgacure™ 819 (0.03 g, 1.5%) was added and the vial sealed and shaken until the photo catalyst was dissolved. The obtained polymer precursor was then combined with MDA-546 and poly(divinylbenzene) microsphere spacer beads according to the percentage amounts depicted in Table 1.

TABLE 1

| Polymer precursor/LC composition | |
|---|---|
| Component | Mass (g) |
| Mass of polymer precursor mixture | 0.401/(20.05%) |
| Mass of liquid crystal MDA-546 | 1.57/(79.95%) |
| poly(divinylbenzene) microspheres (4.0 μm diameter) | 0.025 (1.25% w.r.t. total solids) |

The pre-polymer/LC formulation was next sonicated for 5 minutes and then applied between a 12 pixel ITO patterned PET substrates. The substrate was laminated and the excess formulation wiped away. Curing was conducted under a GE Black light at 1.20 mW/cm² for 15 minutes. The average LC droplet size was measured and found to be 12.64 μm. When addressed electrically according to the conventional drive scheme described by Deng-Ke Ynag et. al (Annu. Rev. Mater. Sci., 1977. 27, 117-146) the planar state was found to be unstable.

Examples 3-10 and Comparative Examples 1-3

Figure 2:
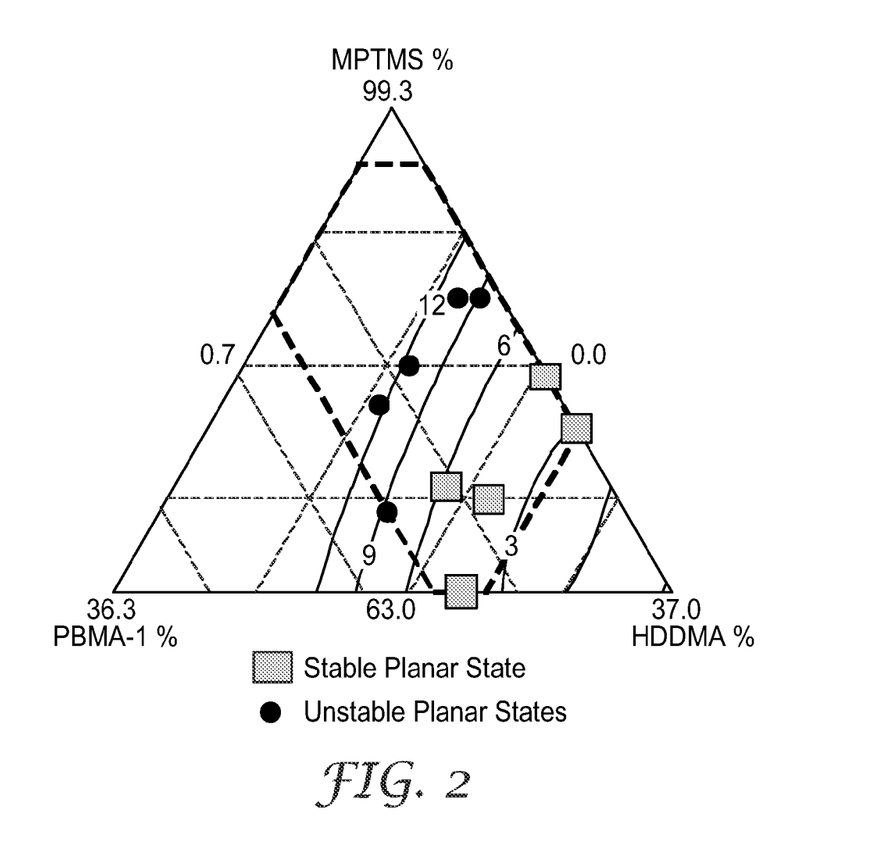
FIG. 2 is a triangular plot of the variation of the average LC droplet size with compositions for MPTMS/HDDMA/PBMA-1.

MPTMS/HDDMA/PBMA-1 Formulations for Planar State Stability, Reflectivity and Color Saturation PBMA-1 was formulated with varied amounts of MPTMS and HDDMA as shown in Table 2. These pre-polymer mixtures were then formulated with MDA-546 according to the method of Example 2. The LC droplet size and the planar state stabilities are given in Table 2 and FIG. 2.

TABLE 2

| ChLCD cell stability for MPTMS/HDDMA/PBMA-1 | | | | | |
|---|---|---|---|---|---|
| Example | Device # | MPTMS/HDDMA/ PBMA-1 (g) | D | Planar state Stability | LC Droplet diameter (μm) |
| Example 2 | 060613-1 | 1.60/0.23/0.17 (80/11.43/8.57%) | 1.13 | fades | 12.64 (±2.19) |
| Example 3 | 060613-5 | 1.40/0.43/0.17 (70/21.43/8.57%) | 1.23 | stable | 3.25 (±0.76) |
| Example 4 | 060613-6 | 1.3/0.53/0.17 (65/26.43/8.57%) | 1.29 | stable | Too small to measure |
| Example 5 | 060613-7 | 1.42/0.37/0.21 (71/18.71/10.29%.) | 1.21 | slightly fades | 5.81 (±1.07) |
| Example 6 | 060613-8 | 1.54/0.22/0.24 (77/11/12%) | 1.13 | fades | 12.04 (±1.65) |
| Example 7 | 060613-10 | 1.26/0.47/0.27 (63/23.29/13.71%) | 1.27 | stable | 4.20 (±0.73) |
| Example 8 | 060613-11 | 1.38/0.31/0.31 (69/15.57/15.43%) | 1.19 | fades | 8.40 (±1.18) |
| Example 9 | 060526-01 | 1.70/0.27/0.03 (85/13.57/1.43%) | 1.13 | fades | 9.25 (±1.19) |
| Example 10 | 060526-5 | 1.70/0.24/0.06 (85/12.14/2.86%) | 1.12 | fades | 9.24 (±1.29) |
| Comparative Example 1 | 060323-3 | 1.70/0.30/0.00 (85/15/0%) | 1.15 | fades | 15.85 (±2.58) |
| Comparative Example 2 | 060309-3 | 2.36/0.615/0.00 (79.33/20.67/0.00%) | 1.20 | stable | 4.35 (±1.33) |
| Comparative Example 3 | 060309-4 | 2.22/0.74/0.00 (75/25/0.00%) | 1.25 | stable | 2.88 (±0.32) |

It is observed that planar state reflectivity correlates to a LC droplet size of <5.5 microns.

Figure 3:
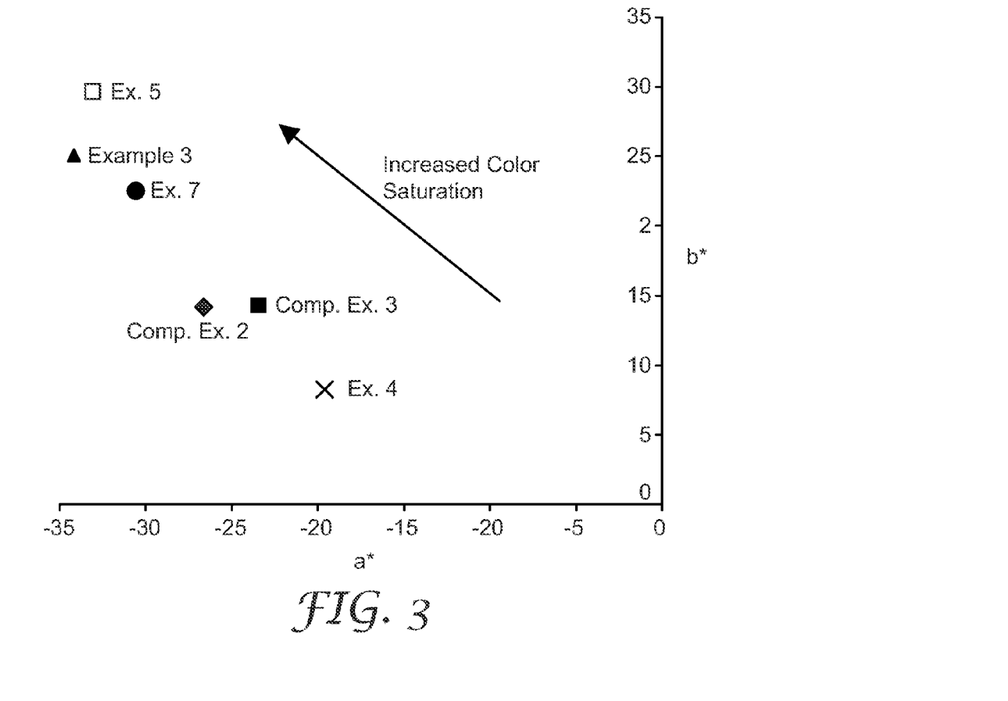
FIG. 3 is the CIE L*a*b plot for planar states for compositions of several Examples formulations.

For the cells of Examples 2-10 with stable planar state reflection, their reflectance data was recorded as well as the corresponding CIE L*a*b color space co-ordinates (Table 3 and FIG. 3). The latter values represent a transformation of the 1931 CIE XYZ space to produce perceptually based axes. Luminance takes values between 0 and 100 where L=0 represents black and L=100 represents white. The a- and b-co-ordinates measure positions (−100 to +100) on green/magenta and blue/yellow axes.

conic state appeared hazy as observed when the cell was placed on a black surface.

Examples 11-22 and Comparative Examples 4-5

Optimization of MPTMS/Elvacite 4059 with Cross Linkers $R^3_n$-$R^4$

According to the general method of Example 2, polymer precursor/LC combinations of MPTMS/Elvacite 4059/$R^3_n$-$R^4$ were combined with 1.5 mass % Elvacite 4059. The

TABLE 3

CIE L *a *b color coordinates for Planar and Focal Conic Reflection (D50 Illuminant and 2 degree observer)

| Example (NB #) | Device # | Planar State | | | Focal Conic State | | | Contrast Ratio L(Planar)/L(Focal Conic) |
|---|---|---|---|---|---|---|---|---|
| | | L | *a | *b | L | *a | *b | |
| Comparative Example 2 | 060309-3 | 56.00 | −26.65 | 14.2 | 31.81 | −2.92 | −6.39 | 1.76 |
| Comparative Example 3 | 060309-4 | 58.05 | −23.4 | −14.28 | 34.57 | −3.42 | −5.33 | 1.68 |
| Example 3 | 060613-5 | 55.82 | −34.16 | 25.09 | 28.52 | −2.30 | −4.19 | 1.96 |
| Example 4 | 060613-6 | 53.09 | −19.60 | 8.23 | 31.85 | −2.79 | −7.65 | 1.67 |
| Example 5 | 060613-7 | 56.43 | −33.09 | 29.67 | 27.88 | −2.08 | −4.98 | 2.02 |
| Example 7 | 060613-10 | 54.19 | −30.54 | 22.46 | 29.04 | −2.31 | −4.66 | 1.87 |

Table 3 shows that incorporation of PBMA-1 (Examples 3, 4, 5, 7) was not detrimental to the brightness of the planar state as shown by the corresponding luminance L value. FIG. 3 shows that the formulations of Examples 3, 5 had correspondingly the best color saturation. Specifically, comparing Comparative Example 2 with Example 3, both having similar D-values and mass % HDDMA, the addition of PBMA-1 to the formulation of Comparative Example 2 at the expense of MPTMS causes significant improvement in color saturation.

Figure 4:
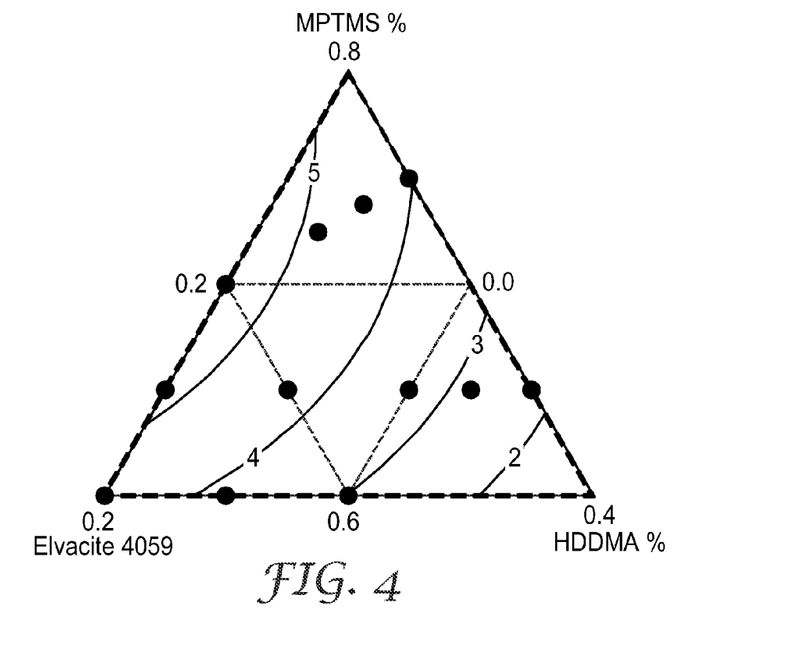
FIG. 4 is a triangular plot of the dependence of peak contrast ratio on the mass % of composition MPTMS/HDDMA/Elvacite 4059.

The best two component formulation was determined to be that of Comparative Example 2. The formulation of Comparative Example 3 gave a stable device however its focal obtained polymer precursor mixture was then combined with MDA-546 and spacer beads according to the percentage amounts depicted in Table 3. The polymer precursor/LC formulation was next sonicated for 5 minutes and then applied between a 12 pixel ITO patterned PET substrates. The substrate was laminated and the excess formulation wiped away. Curing was conducted under a GE Black light at 1.20 mW/cm$^2$ for 15 minutes. The reflectance of the planar and focal conic states are recorded in Table 4. FIG. 4 is a plot of the composition and planar state contrast ratio values for the MPTMS/Elvacite 4059/HDDMA system. It is observed from FIG. 4, that there is an increase in peak contrast ratio with increasing Elvacite™ 4059 content.

TABLE 4

Reflectance and Contrast Ration Evaluation

| Sample # | Device # | $R^3_n$-$R^4$ | MPTMS/Elvacite 4059/$R^3_n$-$R^4$ | D | LC droplet size (μm) | λ @ Peak Planar Refl. | Planar Refl. max | FC Refl. max @ planar | Contrast Ratio based on peak value |
|---|---|---|---|---|---|---|---|---|---|
| Comparative Example 4 | 060323-1 | HDDMA | 0.65/0.00/0.35 | 1.34 | <1.0 | 520 | 27.47 | 12.19 | 2.25 |
| Comparative Example 5 | 060309-4 | HDDMA | 0.75/0.00/0.25 | 1.25 | Not measured | 545 | 31.78 | 8.17 | 3.89 |
| Example 11 | 060323-2 | HDDMA | 0.65/0.05/0.30 | 1.31 | <2.0 | 515 | 31.15 | 9.68 | 3.22 |
| Example 12 | 060323-5 | HDDMA | 0.65/0.025/0.325 | 1.33 | <2.0 | 525 | 29.83 | 10.13 | 2.94 |
| Example 13 | 060323-8 | HDDMA | 0.725/0.05/0.225 | 1.23 | 8.13 (±1.41) | 525 | 30.71 | 5.99 | 5.13 |
| Example 14 | 060322-1 | HDDMA | 0.738/0.025/0.238 | 1.24 | 4.30 (±0.62) | 545 | 31.96 | 7 | 4.57 |
| Example 15 | 060328-1 | HDDMA | 0.70/0.10/0.20 | 1.22 | 10.16 (±1.96) | 535 | 28.23 | 5.58 | 5.06 |
| Example 16 | 060328-3 | HDDMA | 0.65/0.10/0.25 | 1.27 | 5.75 (±1.06) | 535 | 28.23 | 6.93 | 4.07 |
| Example 17 | 060330-4 | HDDMA | 0.65/0.15/0.20 | 1.23 | 7.14 (±1.78) | 545 | 30.71 | 5.52 | 5.56 |

TABLE 4-continued

Reflectance and Contrast Ration Evaluation

| Sample # | Device # | $R^3{}_n$–$R^4$ | MPTMS/Elvacite 4059/$R^3{}_n$–$R^4$ | D | LC droplet size (μm) | λ @ Peak Planar Refl. | Planar Refl. max | FC Refl. max @ planar | Contrast Ratio based on peak value |
|---|---|---|---|---|---|---|---|---|---|
| Example 18 | 060330-5 | HDDMA | 0.60/0.15/0.25 | 1.29 | 3.74 (±0.62) | 545 | 29.95 | 7.45 | 4.02 |
| Example 19 | 060331-8 | HDDMA | 0.60/0.20/0.20 | 1.25 | 10.01 (±1.63) | 545 | 24.29 | 5.62 | 4.32 |
| Example 20 | 060331-10 | HDDMA | 0.60/0.10/0.30 | 1.33 | <3.0 | 540 | 27.12 | 9.31 | 2.91 |
| Example 21 | 061018-03 | SR-492 | 0.61/0.29/0.09 | 1.40 | 7.09 (±2.26) | 540 | 29.67 | 8.21 | 3.62 |
| Example 22 | 061018-04 | CD-501 | 0.55/0.36/0.09 | 1.40 | 6.77 (±2.17) | 540 | 32.88 | 4.64 | 4.30 |

Example 23

Use of Pre-polymer Formulation Comprising a Non-hydrolysable Silane

Into a vial fitted with Teflon seal was introduced MMP-DMS (1.28 g, 64% by mass), HDDMA (0.44 g, 22%) and Elvacite 4059 (0.28 g, 14%). This was agitated on a mechanical shaker at room temperature for about 16 hours to give a clear solution. The photo initiator Irgacure™ 819 (0.03 g, 1.5%) was added and the vial sealed and shaken until the photo catalyst was dissolved. The obtained pre-polymer mixture was then combined with MDA-546 and spacer beads according to the percentage amounts depicted in Table 1.

Processing of the corresponding ChLCD cell was carried out according to the standardized conditions of Example 2. The obtained ChLCD cell gave stable planar state reflection. The LC droplet size was less than 2.0 μm and the contrast ratio was 3.10.

Example 24

Determination of Processing Window: Evaluation of Cell Thermal Stability

Fading of the planar state of ChLCD devices in part reflects monomer or oligomer contamination of the LC phase, particularly when the PIPS process is incomplete. Here we subject the formulations of Examples 14, 16 and 17 to the PIPS process at varied black light intensity for 15 minutes. The obtained cells were annealed in 5° C. increments from room temperature to about 55° C. The annealing time in each case was 15 minutes. At each annealing temperature, the cells were allowed to cool to room temperature and the planar state of the cell then refreshed before recording the reflectance. Plots were made of percentage change in reflectance versus temperature. The temperature at which there was a significant drop-off in reflectance is noted in Table 5.

TABLE 5

Thermal Stability and corresponding UV irradiation window for MPTMS/Elvacite 4059/HDDMA

| Formulation Example | Device # | 15 minutes @ 1.2 mW/cm² | 15 minutes @ 1.5 mW/cm² | 15 minutes @ 1.9 mW/cm² |
|---|---|---|---|---|
| Example 14 | 060322-1 | 45–50 | 45–50 | 35–40 |
| Example 16 | 060328-3 | 45–50 | 45–50 | 40–45 |
| Example 18 | 060330-5 | 45–50 | 40–45 | 35–40 |

It is observed that the formulation of Example 16 gives the largest irradiation process window of 1.2-1.5 mW/cm².

We claim:

1. A composition comprising:
   a liquid crystal component,
   a photo polymerization initiator; and
   a polymer precursor component comprising:
   (i) 40 to 95% wt of a first monomer of structure (I)

$$R^1{}_m R^2{}_p Si(X)_{4-m-p} \quad (I)$$

wherein,
   $R^1$ is a acryloxy, methacryoxy, or (meth)acryloxyalkyl;
   $R^2$ is independently selected from hydrogen, ($C_1$-$C_{12}$) alkyl, ($C_6$-$C_{12}$)aryl, or $C_7$-$C_{17}$)arylalkyl;
   X is a hydrolysable or non-hydrolysable group;
   m is an integer from 1 to 3 and (m+p) is an integer from 1 to 3;
   (ii) 0.05 to 65% wt of one or more second monomers of structure (II)

$$R^3{}_n\text{-}R^4 \quad (II)$$

wherein,
   $R^3$ is independently selected from acryloxy or methacryloxy,
   $R^4$ is ($C_1$-$C_{20}$)alkyl or ($C_7$-$C_{17}$)arylalkyl, optionally containing one or more heteroatomic substitutions independently selected from S, O, Si, or N;
   n is an integer from 1 to 4;
   (iii) 0.05 to 55% wt of a ester, urethane, or (meth)acrylate based polymer or oligomer, bearing one or more reactive (meth)acrylate groups.

2. A composition according to claim 1, wherein the polymer precursor further comprises a third monomer of structure (III)

(III)

wherein,
$R^5$ is hydrogen or —$CH_3$,
$R^6$ is ($C_1$-$C_{12}$)alkyl, ($C_6$-$C_{12}$)aryl, or ($C_7$-$C_{17}$)arylalkyl.

3. A composition according to claim 1, wherein the composition comprises 60 to 95% wt liquid crystal component.

4. A composition according to claim 1, wherein the composition comprises 0.1 to 5% wt photo initiator.

5. A composition according to claim 1, wherein X is a hydrolysable group.

6. A composition according to claim 1, wherein X is an alkoxy group.

7. A composition according to claim 1, wherein the first monomer of structure (I) is a mixture thereof, wherein $R^7$ is hydrogen or —$CH_3$.

8. A composition according to claim 1, wherein the second monomer is trimethylopropane triacrylate, hexanediol dimethacrylate, hexanediol diacrylate, butanediol dimethacrylate, ethylene glycol diacrylate, or ethylene glycol dimethacryalte.

9. A composition according to claim 1, wherein the (meth)acrylate based polymer or oligomer is a polybutyl methacrylate having pendant methacrylate groups.

10. A composition according to claim 1, comprising:
60 to 95% wt liquid crystal component,
0.1 to 5% wt photo polymerization initiator with respect to the polymer precursor; and
5 to 40% wt polymer precursor component comprising:
  (i) 60 to 85% wt of the first monomer of structure (I),
  (ii) 5 to 30% wt of one or more second monomers of structure (II),
  (iii) 5 to 30% wt of a ester, urethane, or (meth)acrylate based polymer or oligomer, bearing one or more reactive (meth)acrylate groups.

11. A composition according to claim 1, comprising:
70 to 95% wt liquid crystal component,
0.1 to 5% wt photo polymerization initiator with respect to the polymer precursor; and
5 to 30% wt polymer precursor component comprising:
  (i) 40 to 95% wt of the first monomer of structure (I)

wherein $R^7$ is hydrogen or —$CH_3$
  (ii) 0.05 to 65% wt of hexanediol dimethacrylate, and
  (iii) 5 to 55% wt of a polybutyl methacrylate having pendant methacrylate groups.

12. A composition according to claim 1, comprising:
70 to 95% wt liquid crystal component,
0.1 to 5% wt photo polymerization initiator with respect to the polymer precursor; and
5 to 30% wt polymer precursor component comprising:
  (i) 60 to 85% wt of the first monomer of structure (I)

wherein $R^7$ is hydrogen or —$CH_3$
  (ii) 5 to 30% wt of hexanediol dimethacrylate, and
  (iii) 5 to 30% wt of a polybutyl methacrylate having pendant methacrylate groups.

13. A composition according to claim 1, wherein the one or more second monomers of structure (II) is independently selected from one or more of the monomers of structure (IIa-IId);

-continued (IId)

wherein,
Y is $(C_2-C_{20})$alkyl;
n is individually an integer from 0 to 10;
Z is $—C_2H_4—$ or $—C_3H_6—$;
$R^8$ is $—H$ or $—CH_3$; and
$R^9$ is $—H$ or $—OH$.

14. A method of forming a bistable electro-optical device comprising:
providing a first substrate having a first conductive inner surface;
providing a second substrate having a second conductive inner surface, wherein at least one of the first substrate or second substrate is transparent to visible light; and
disposing a composition on the first conductive inner surface, the composition comprising:
(a) a liquid crystal component,
(b) a photo polymerization initiator; and
(c) a polymer precursor component comprising:
(i) 40 to 95% wt of a first monomer of structure (I)

$$R^1{}_m R^2{}_p Si(X)_{4-m-p} \quad (I)$$

wherein,
$R^1$ is a acryloxy, methacryoxy, or (meth)acryloxyalkyl;
$R^2$ is independently selected from hydrogen, $(C_1-C_{12})$alkyl, $(C_6-C_{12})$aryl, or $(C_7-C_{17})$arylalkyl;
X is hydrolysable or non-hydrolysable group;
m is an integer from 1 to 3 and (m+p) is an integer from 1 to 3;

(ii) 0.05 to 55% wt of one or more second monomers of structure (II)

$$R^3{}_n\text{-}R^4$$

wherein,
$R^3$ is independently selected from acryloxy or methacryloxy,
$R^4$ is $(C_1-C_{20})$alkyl,
n is an integer from 1 to 4;
(iii) 5 to 65% wt of a ester, urethane, or (meth)acrylate based polymer or oligomer, bearing one or more reactive (meth)acrylate groups;
disposing the second conductive surface on the composition; and
curing the composition to formed a cured composition.

15. The method according to claim 14, wherein the curing step comprises curing the composition to form a cured composition having a thickness in a range from 1 to 15 micrometers.

16. The method according to claim 15, wherein the curing step comprises radiation curing the composition at a range from 0.1 to 10 mW/cm$^2$.

17. The method according to claim 15, wherein the curing step comprises radiation curing the composition at a range from 0.2 to 3 mW/cm$^2$.

18. The method according to claim 14, wherein the providing the first substrate comprises providing a first flexible transparent polymeric substrate or the providing a second substrate comprises providing a second flexible transparent polymeric substrate.

19. The method according to claim 14, wherein the method is conducted on a roll-to-roll apparatus.

20. The method according to claim 14, wherein the curing step comprises curing the composition to form a cured composition having a disperse liquid crystal phase and a continuous poly(meth)acrylate phase.

21. The method according to claim 14, wherein the providing the first substrate comprises providing a first substrate having a first conductive inner surface being a patterned electrode or the providing the second substrate comprises providing a second substrate having a second conductive inner surface being a patterned electrode.

22. The method according to claim 14, wherein the disposing step comprises disposing the composition comprising a cholesteric liquid crystal material.

23. The method according to claim 14, wherein the disposing step comprises disposing the composition comprising a nematic liquid crystal material.

* * * * *

UNITED STATES PATENT AND TRADEMARK OFFICE
CERTIFICATE OF CORRECTION

PATENT NO. : 7,648,645 B2  Page 1 of 1
APPLICATION NO. : 11/557540
DATED : January 19, 2010
INVENTOR(S) : Ralph R. Roberts It is certified that error appears in the above-identified patent and that said Letters Patent is hereby corrected as shown below:

Column 8
Line 1; delete "MPTMeS)," and insert -- MPTMS), --, therefor.
Line 1; delete "methacaryloxymethy" and insert -- methacryloxymethyl --, therefor.
Line 2; after "(MMPDMS)" insert -- . --.
Line 12; delete "trimethlyopropane" and insert -- trimethylolpropane --, therefor.
Line 60; delete "trimethylopropane" and insert -- trimethylolpropane --, therefor.

Column 9
Line 4; delete "methacryalte" and insert -- methacrylate --, therefor.

Column 10
Line 32; delete "Methacaryloxymethy" and insert -- Methacryloxymethyl --, therefor.
Line 58; after "MDA-546" insert -- . --.

Column 16
Line 29; Claim 1, delete "methacryoxy," and insert -- methacryloxy, --, therefor.

Column 17
Line 42; Claim 8, delete "trimethylopropane" and insert -- trimethylolpropane --, therefor.
Line 46; Claim 8, delete "dimethacryalte." and insert -- dimethacrylate. --, therefor.

Column 19
Line 43; Claim 14, delete "methacryoxy," and insert -- methacryloxy, --, therefor.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO.      : 7,648,645 B2
APPLICATION NO. : 11/557540
DATED           : January 19, 2010
INVENTOR(S)     : Roberts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 210 days.

Signed and Sealed this

Twenty-third Day of November, 2010

David J. Kappos
*Director of the United States Patent and Trademark Office*